US006535116B1

United States Patent
Zhou

(12) United States Patent
(10) Patent No.: US 6,535,116 B1
(45) Date of Patent: Mar. 18, 2003

(54) WIRELESS VEHICLE MONITORING SYSTEM

(76) Inventor: Joe Huayue Zhou, 3323 Lotus Dr., Hacienda Hts, CA (US) 91745

( * ) Notice: Subject to any disclaimer, the term of this patent is extended or adjusted under 35 U.S.C. 154(b) by 187 days.

(21) Appl. No.: 09/640,271

(22) Filed: Aug. 17, 2000

(51) Int. Cl.$^7$ ............................................... B60C 23/00
(52) U.S. Cl. ......................... 340/447; 340/438; 340/442
(58) Field of Search ................................ 340/442, 444, 340/445, 447, 438; 73/146.5, 146.2, 146; 200/61.22, 61.25

(56) References Cited

U.S. PATENT DOCUMENTS

| | | | |
|---|---|---|---|
| 5,119,066 A | * 6/1992 | Ballyns | 340/442 |
| 5,963,128 A | * 10/1999 | McClelland | 340/447 |
| 6,259,361 B1 | * 7/2001 | Robillard et al. | 340/447 |
| 6,278,363 B1 | * 8/2001 | Bezek et al. | 340/442 |
| 6,408,690 B1 | * 6/2002 | Young et al. | 73/146.5 |
| 6,453,737 B2 | * 9/2002 | Young et al. | 340/447 |

* cited by examiner

Primary Examiner—Van Trieu

(57) ABSTRACT

A wireless vehicle safety monitoring system, including a portable monitor unit and a plurality of sensor modules that can monitor vehicle tire pressure, detect presence of object and its distance behind the vehicle, and monitor the security of the vehicle. The sensor modules communicate by encoded RF wireless transmission with the monitor unit, which will display the individual tire pressure on it's LCD panel while the vehicle is moving, and also display any detected object range information during the vehicle reverse motion. When one or more monitoring situations arise (bad tire pressure, object detection, or vehicle security violation), the monitor unit will issue warnings to alert the vehicle owner. The wireless pressure sensor module is miniaturized for easy mounting on the tire valve stem with minimal obstruction. The wireless ultrasonic object detection sensor module is mounted on the rear license plate holder. The small monitor unit can be dashboard-mounted or placed on any viewable location in the vehicle, or carried by the user. The system's unique power-conservation technology enables the monitor unit to operate on a single 1.5V AA battery for over six months, and for the sensor modules to operate close to 18 months without needing to change batteries.

10 Claims, 14 Drawing Sheets

VEHICLE MONITOR , PRESSURE SENSOR AND OBJECT DETECTION BLOCK DIAGRAMS

VEHICLE MONITOR, PRESSURE SENSOR AND OBJECT DETECTION BLOCK DIAGRAMS

ENGINE ON/OFF SENSOR
MODULE BLOCK DIAGRAM

CAR ALARM TRIGGER MODULE BLOCK DIAGRAM

RF SIGNAL REPEATER MODULE BLOCK DIAGRAM

ENGINE ON/OFF SENSOR MODULE, ALARM TRIGGER MODULE
AND RF REPEATER MODULES BLOCK DIAGRAMS

PRESSURE SENSOR MODULE INSTALLATION
AND MERCURY ROLL MOTION SWITCH

1. CASE
2. CAP
3. SENSOR PCB, STACK ASSEMBLY
4. CLIP, BATTERY
5. BATTERY PACK, CR1225/2PACK ASSEMBLY
6. O-RING, STATIC SEAL
7. O-RING, STATIC SEAL
8. MERCURY ROLL SWITCH

TIRE PRESSURE SENSOR MODULE ASSEMBLY

TIRE PRESSURE SENSOR STACK ASSEMBLY

OBJECT DETECTION MODULE INSTALLATION

```
S1-S25-----TIRE/BODY ICONS FOR ALL VEHICLES
S26------- SIGNAL CONDITION
S27------- STATUS OK
S28------- S27 AND S28 ON: STATUS NOT OK
S29------- BATTERY LOW
DIGIT1,2---- PRESSURE/RANGER VALUE DISPLAY
S30------- PRESSURE UNIT IS PSI
S31------- PRESSURE UNIT IS BAR
```

MONITOR LCD PANEL

MONITOR RF RECEIVER SECTION

MONITOR LOGIC SECTION

TIRE PRESSURE SENSOR MODULE

OBJECT DETECTION MODULE

VEHICLE ENGINE ON/OFF SENSOR MODULE

VEHICLE ALARM TRIGGER SENSOR MODULE

VEHICLE RF SIGNAL REPEATER MODULE

WIRELESS VEHICLE MONITORING SYSTEM

FIELD OF THE INVENTION

The invention relates to the field of vehicle tire pressure monitoring, proximity object detection, and vehicle alarm system. Particularly, the invention relates to an apparatus for automatically monitoring tire pressure, detecting nearby objects and monitoring vehicle security, and methods for constructing and operating the apparatus.

BACKGROUND OF THE INVENTION

Numerous innovations for each parts of the vehicle monitoring system have been provided in prior arts.

1. Tire Pressure Monitor

Pressure sensors have long been used to monitor tires for determining whether the tire was properly pressurized. Known methods for monitoring tire pressure included:

(a) A pressure sensor module installed inside the tire and transmitted the pressure data by wireless RF signal to a monitor located in the passenger compartment of a vehicle. With this method, system installation and battery replacement would be very inconvenient.

(b) A pressure sensing and transmission device mounted in the inner end of the tire valve, and transmitted the pressure data to a monitor. With this method, system installation and battery replacement would also be inconvenient.

(c) A pressure sensing and transmission device mounted on the tire valve stem. The device has a pressure sensitive diaphragm and spring switch for triggering the transmission of low-pressure warning signal to the monitor. With this method, however, the system can't monitor the pressure data continuously.

U.S. Pat. No. 4,804,808 issued to Dal Cero on Feb. 14, 1989 discloses a pressure-sensing device that senses low tire pressure and signals low pressure using a transmitter and a receiver.

U.S. Pat. No. 4,694,273 issued to Franchino on Sep. 15, 1987 discloses a tire pressure-sensing device having a movable element to trigger a radio transmission signal, which is then received by a receiver for activating visual and acoustic alarms.

U.S. Pat. No. 5,289,161 issued to Huang on Feb. 22, 1994 discloses a pressure gauge having a diaphragm that pushes a spring-loaded rod between two switch devices which, when the tire is not properly pressurized, will trigger the sending of an encoded RF signal to a receiver for generating alarms.

U.S. Pat. No. 5,694,111 issued to Huang on Dec. 2, 1997 discloses an encoder unit and a transmitter circuit for a tire pressure sensor device for generating encoded RF signals received by a receiver with a display unit.

U.S. Pat. No. 4,734,674 issued to Thomas on Mar. 29, 1988 also discloses a tire pressure sensing device that, upon low pressure, transmits an encoded signal to a receiver having a plurality of display indicators on a front panel that are selectively activated to indicate the respective tire.

U.S. Pat. No. 4,319,220 issued to Pappas on Mar. 9, 1982 discloses a system for monitoring tire pressure of the tires having respective transmitters communicating alarm signals to a receiver.

U.S. Pat. No. 5,001,457 issued to Wang on Mar. 19, 1991 teaches a cab mounted monitor having a graphic display for visually indicating under-pressurized tire, which is identified by encoded signals transmitted from respective tire pressure sensing transmitters to the cab mounted central receiver.

Typically, these systems teach tire valve mounted pressure sensors responsive to individual tire pressures for generating encoded signals transmitted to a receiver with graphic displays. However, these teachings do not address or not able to resolve many practical issues, as described below:

(i) Continuous Pressure Monitoring

Properly pressurized tires are utmost important for safe driving and for prolonging the life of tires. Also, drivers often do not even aware that a tire is punctured and slowly leaking air, until the damaged tire went flat. A safe and practical system should monitor and display the tire pressure continuously for tire pressure maintenance and air leaking tire detection. The prior systems typically only generate alarms when the tire pressure is lower than a predetermined level and, therefore, provide very little information to the driver.

(ii) Sufficiently Small Pressure Sensor Size

A tire valve-stem mounted pressure sensor, which is usually in a cylindrical shape, must be small enough to be practical. Sensor size larger than 0.65 inch tall and 0.65 inch in diameter would present problems for sidewalk parking, car washing, and for secure mounting on the value stem. A larger sensor also would be more easily be detached from a valve stem of a fast moving vehicle due to tire rotation and airflow. It is technically very challenging to make a functional device that includes pressure sensor, motion detector, power supply, and RF signal transmission electronics in a very small package. Prior systems generally do not address methods to make small sensor modules.

(iii) Long Sensor Operating Life Between Battery Changes

A small sensor module can only have a mini-scale power supply. Therefore, a practical system must manage power consumption for providing a longer sensor operating life (preferably 18 months or more of normal usage) between battery changes. The few prior systems that discussed power saving at all did not present satisfactory methods.

(iv) Long and Large Vehicle Tire Pressure Monitoring

Prior arts generally do not address the problem of how to monitor tire pressures in larger vehicles with wheels far away from the receiver in the driver cab. A small sensor module physically can not be equipped with a very efficient antenna for RF message transmission, and the RF signal power is limited by the FCC regulations. Tire rotation would also create interference to further weaken the signal. Therefore, it is very difficult for a cab-mounted monitor to have a good reception for the weak data messages from the rear tire pressure sensors of a long truck or a trailer. Therefore, prior-art valve stem mounted sensors can not be successfully used on monitoring tire pressures in larger vehicles.

2. Object Detection Monitor

Safety concerns have led to numerous proposals for devices to be used in automobiles to detect the proximity of other vehicles or objects for collision avoidance. Known methods for object detection included:

(a) A radar-liked device that transmitted high frequency RF signals and then detected the object echo-reception signals; the signal travel time can be used to determine the object distance. However, with this method, the system is complicated, expensive, and has low range resolution for nearby objects.

(b) A device that transmitted infrared signals and then detected the intensity of the reflected signals to determine the object distance. However, with this method, the monitoring range is very short, and the system performance would be unstable due to environmental interference.

(c) A device that transmitted ultrasound signals and then detected the object echo-reception signals; the signal travel time can be used to determine the object distance.

U.S. Pat. No. 4,450,430 issued to Barishpolsky on Apr. 24, 1981 discloses a method for a diaphragm-type transducer assembly is mounted on the rear of an automobile to transmit ultrasound into left-and-right-hand target regions near the automobile. When the turn signal is turned on, it will transmit ultrasound pulse and listens for echo response from object.

U.S. Pat. No. 4,450,430 issued to Bonnefoy on Mar. 20, 1997 discloses a method for controlling a device for the ultrasound detection of objects in air, and to monitor object range during the vehicle reverse motion.

Typically, these systems teach ultrasonic object detection methods. However, these systems do not provide continuous visual range readings to the driver using wireless transmittal of detected object data, and the system installation would be difficult.

3. Vehicle Alarm System

Most automobile security systems relied on siren alarms for audio notification of vehicle security violation. If the vehicle owner was out of the hearing range, however, he or she will be unable to know whether the car alarm has been trigged. A known method of remote notification was to transmit a coded RF signal, upon alarm activation, to a portable receiver carried by the vehicle owner.

U.S. Pat. No. 5,905,432 issued to Greene on May 8, 1998 discloses a method for a vehicle anti-theft alarm system having a vehicle monitor with a battery, microprocessor, transmitter, audio generator and motion sensor, and the system also having a portable receiver.

U.S. Pat. No. 6,028,506 issued to Xiao on Feb. 22, 2000 discloses a method for a car alarm paging system, comprising an improvement of a conventional wireless phone pager and transmitter. The modified pager can be used both as a phone pager and also as a vehicle alarm transmitter for the notification of alarm activation to the pager carrier. A sample alarm trigger sensor module is provided in this invention.

Typically, these prior-arts teach vehicle alarm systems with a portable receiver, or a receiver with multiple uses. However, there are already many excellent vehicle, alarm systems available, and what these systems lacking is a method to remotely notify the user upon vehicle security violation. Therefore, a practical notification solution is not necessary to invent a more sophisticate alarm system with a remote receiver, but to invent a stand-alone notification system that can be coupled with a user-chosen alarm system.

Even though prior innovations may be suitable for the specific individual purpose to which they address, they differ from the present invention as hereinafter contrasted.

SUMMARY OF THE INVENTION

A main object of the present invention is to provide a wireless vehicular safety monitoring system, which can monitor tire pressure, detect objects behind the vehicle, and remotely notify vehicle security violations.

Another object of the invention is to provide a small battery-operated monitor unit, which can display individual tire pressure and detected-object range, and which can be carried by the vehicle owner for learning about car alarm activation from as far as 1000 feet away.

Another object of the invention is to provide a power-conservation method and apparatus, which allow the monitor unit to use minimal power when the vehicle is turned off. When a car is operating, its battery voltage is higher than when the engine is turned off. This system used a battery-voltage sensor module to detect the vehicle engine on/off status, and then transmit the status via RF signal to the monitor unit. Therefore, in engine-off time, the monitor unit can go to sleep and only wake up 10 milliseconds for every 2 seconds to detect any new engine-on message or alarm trigger message. This power-saving method enables the monitor unit to operate on a single 1.5V AA size battery for over six months.

Another object of the invention is to provide another power-conservation method and apparatus, which allow the tire pressure sensor module to stop consuming power when the vehicle is stationary. The tire pressure sensor module used omni-directional mercury roll motion switch for controlling its battery power supply, which will be turned on only while the vehicle is moving. This power-saving method enables the sensor module to operate on one set of button battery for over 18 months.

Another object of the invention is a method for constructing miniature sensor modules by first laying out print circuit and mounting components on a flexible rectangular sheet. Then the circuit sheet is vertically mounted on the base print circuit board for circularly surrounding the protruding pressure sensor, so that optimal utilization of space inside the module housing can be realized.

Another object of the invention is a method for mounting ultrasonic transducers on the license plate holder. And a method for transmitting range data of detected objects to the monitor unit by coded RF signal.

Another object of the invention is a method to re-transmit the sensor module RF signals for enhancing monitor signal reception. For example, signals from tire pressure sensor modules mounted on the rear tire stems of a long truck or trailer might be too weak for the cab-mounted monitor to receive. A RF signal repeater, installed near the rear section of the truck, can pick up the sensor module signal there and then re-transmit the signal to the monitor via a more efficient antenna.

The present invention is directed toward a vehicular monitoring system that gathers information through wireless sensor modules. Actual working models have been constructed to prove the practicality of the invention. The invention has provided numerous innovations to enable the making of a viable product.

The invention has the advantages of integrating several essential vehicle-monitoring functions into one package, and displaying the information on a battery-operated monitor unit, which can be put on any viewable location inside the vehicle, or be carried by the vehicle owner for remote notification. The monitor unit is designed to be small and durable, using one 1.5V AA battery that can support over six months of operation.

Another advantage of the invention is to provide a practical tire pressure monitoring solution. Prior proposals have discussed various concepts of monitoring tire pressure with a valve stem mounted sensor. Until now, however, very few (if any) such products are available on the market. This is a clear indication of its technical difficulties. The present invention overcomes the technical challenges by providing means to miniaturize the sensor module and to prolong its operational life between battery changes. The working tire pressure sensor module has a diameter and height of only 0.62 inches, and can last almost 18 months without needing to replace batteries.

Another advantage of the invention is to provide a practical tire pressure monitoring solution for all vehicles, large and small, by using RF signal repeaters to relay signals from farther away sensors to where the monitor is mounted.

Another advantage of the invention is to provide a practical solution for a driver to learn about the presence and distance of rear objects during vehicle reverse motion. The invention provided means for easy installation of ultrasonic transducers on the license plate holder, and for transmitting detected object range to the monitor unit via encoded RF signal.

Another advantage of the invention is to provide an effective way for vehicle owner to learn about vehicle alarm activation from as far as 1000 feet away.

DETAILED DESCRIPTION OF THE INVENTION

Figure 1A:
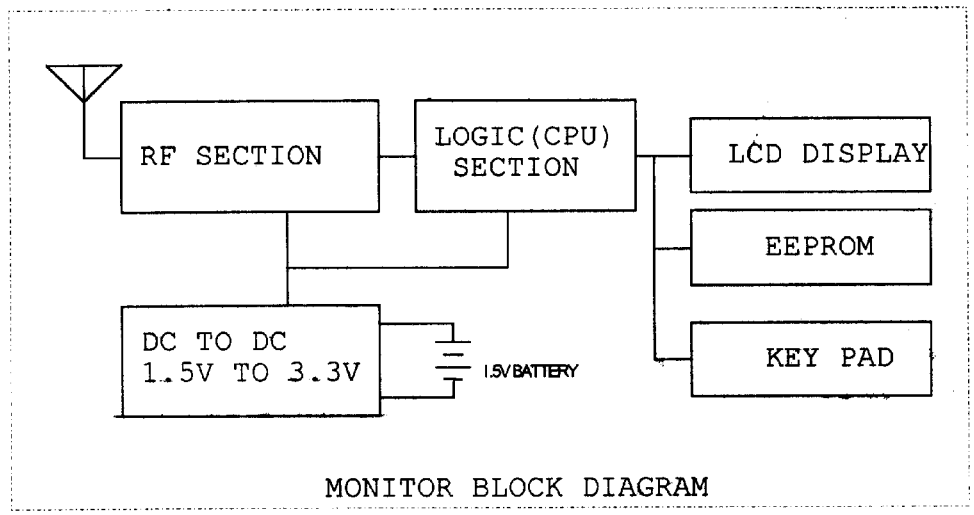
FIG. 1A is the block diagrams for the vehicle monitor, tire pressure sensor module, and object detection module.
Figure 1A:
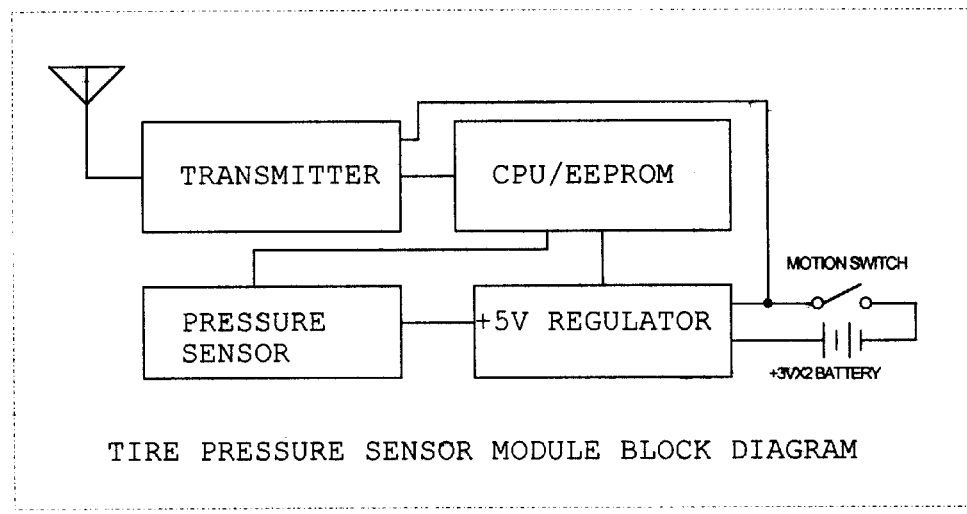
Figure 1A:
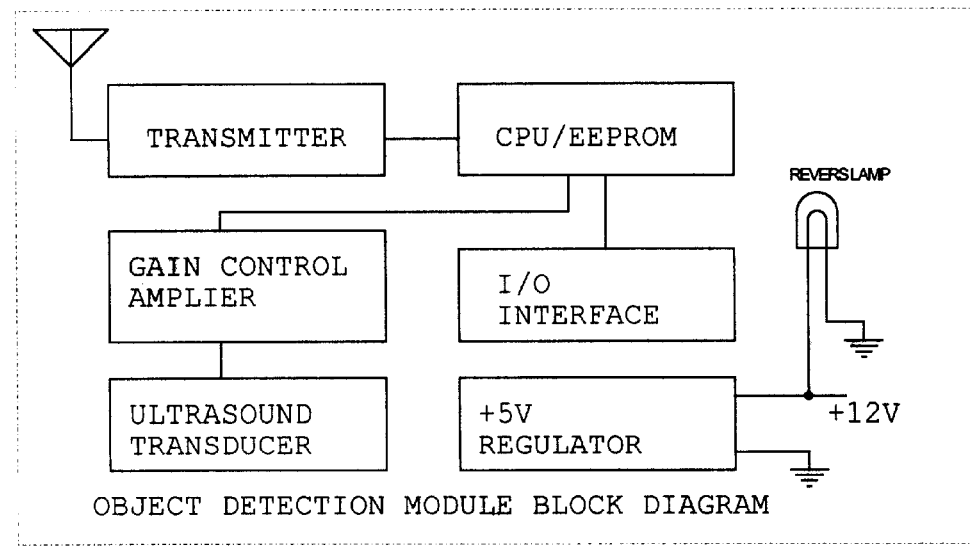
Figure 1B:
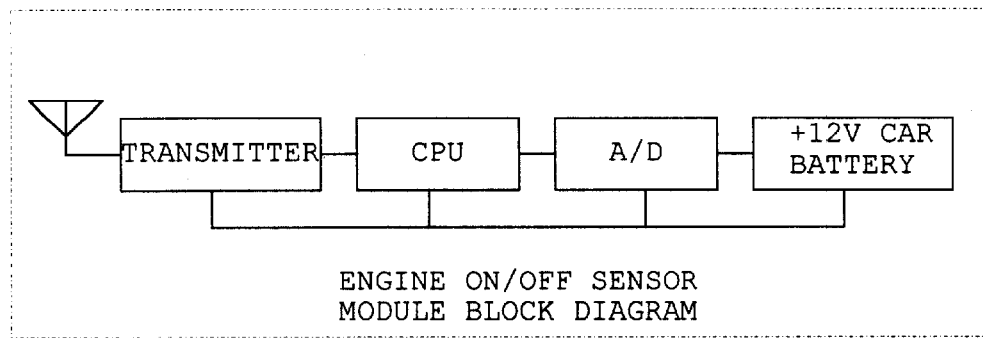
FIG. 1B is the block diagrams for the engine ON/OFF sensor module, alarm trigger module, and RF signal repeater module.
Figure 1B:
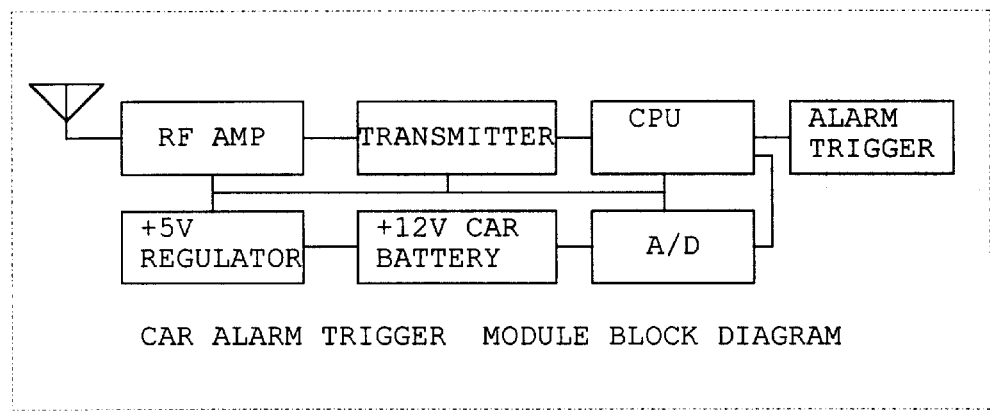
Figure 1B:
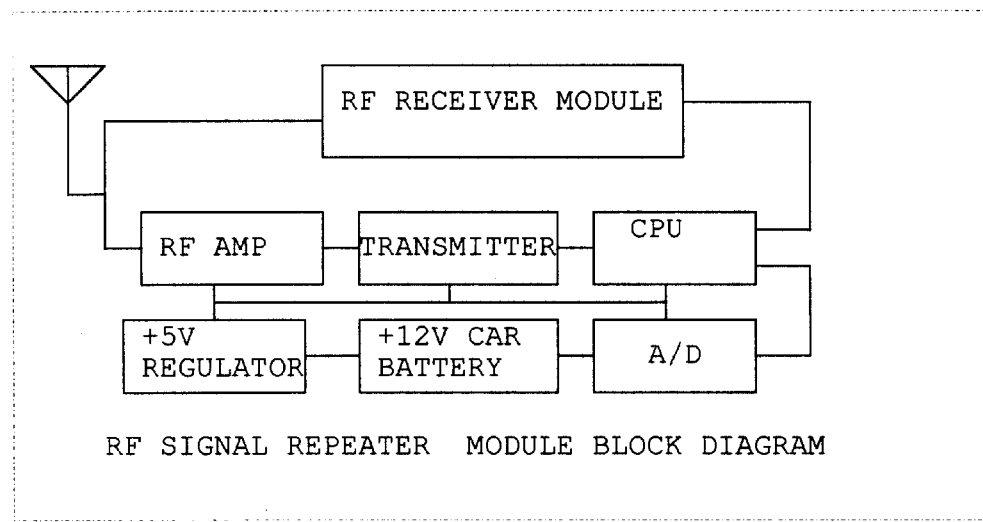

An embodiment of the invention is described herein with references to the figures using reference designations as shown in the figures. The wireless vehicle monitoring system comprises battery-powered components that are referred to as the monitor unit and sensor modules, shown by way of block diagram representation in FIG. 1A and FIG. 1B. Together, these devices monitor tire pressure, alarm activation, and object detection status. When the vehicle is moving, the monitor can display individual tire pressures. During vehicle reverse motion, the monitor can display detected object range with respect to the rear of the vehicle. In the events that the tire pressure drops below a predetermined level, alarm system has been tripped, or object is detected behind the vehicle, the monitor will generate warnings for alerting the system user.

Figure 2A:
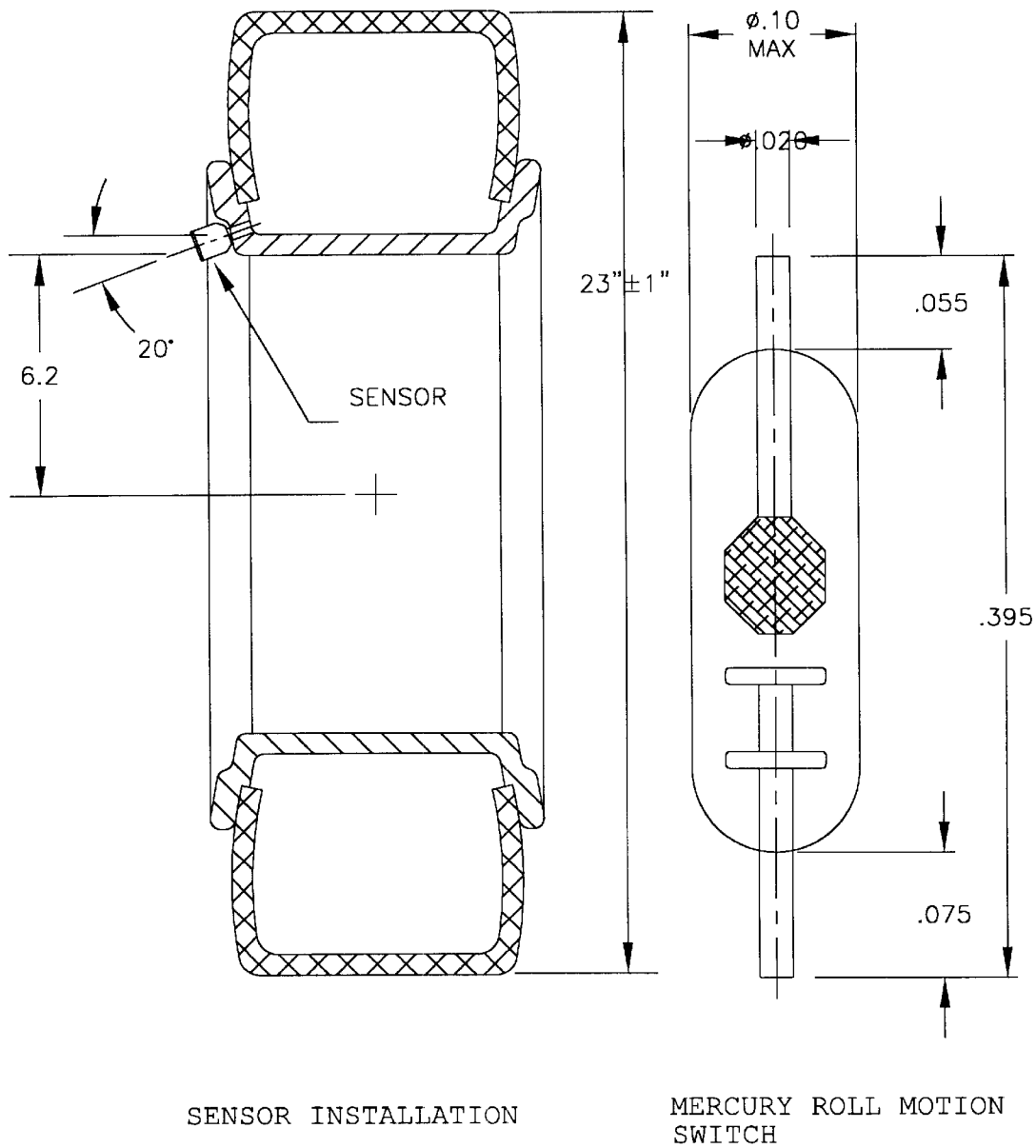
FIG. 2A is a sketch of the mercury omni-directional motion switch, and tire sensor module installation.

The miniature tire pressure sensor module, shown by FIG. 2A, is securely attached to the valve stems of the respective tires. These tire pressure sensor modules are encased in a small plastic housing, shown by FIG. 2B, with suitable threads for valve stem attachment. The tire pressure sensor modules are made by vertically mounting a flexible print circuit sheet on top of a base print circuit board, and surrounding the protruding pressure sensor, shown by FIG. 2C. The rear object detection module is shown by FIG. 2D. The monitor unit is enclosed in a pager-sized plastic housing with a LCD display panel, shown by FIG. 3. The small monitor unit can be dashboard mounted, rearview mirror mounted, or carried by the user. These devices are also shown by the way of schematic representation in FIG. 4 through FIG. 9, respectively.

Figure 3:
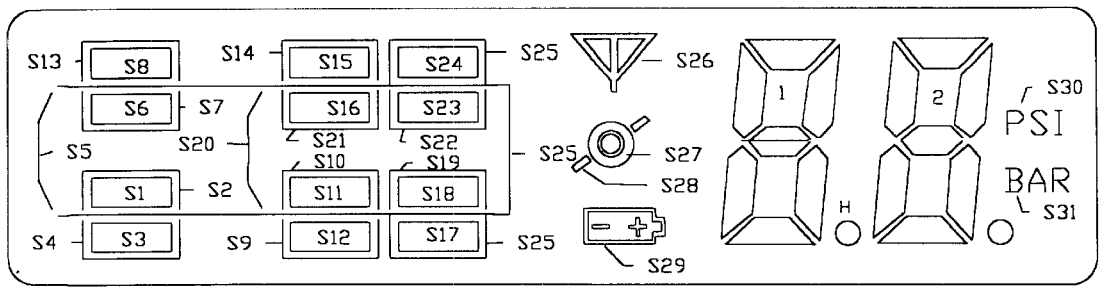
FIG. 3 is a drawing depicting the display panel of the monitor unit.

Now, referring to FIGS. 3, the monitor display panel shows a graphic representation of a vehicle, with icons S1 to S25 indicating respective tire locations in the vehicle, which included possibly a trailer. Icon S26 is to indicate that incoming signal is out of the receivable range. Icon S27 indicates proper monitor operation and proper operating tire pressures. Icon S28 indicates monitor malfunction or improper tire pressure, such as a low tire pressure. Icon S29 indicates low battery level in the monitor, or in one or more of the tire pressure sensor modules if the respective tire icon is flashing. The monitor display panel further includes a plurality of numerical indicators, such as digit 1 and digit 2. These numerals can display a two-digit tire pressure values in PSI, as indicated by icon S30, or a two-digit tire pressure in BAR, as indicated by icon S31. Display digits 1–2 are also used to display the detected object range during vehicle reverse motion and, when in programming mode, to display system setup values such as the proper tire pressure level.

Figure 4A:
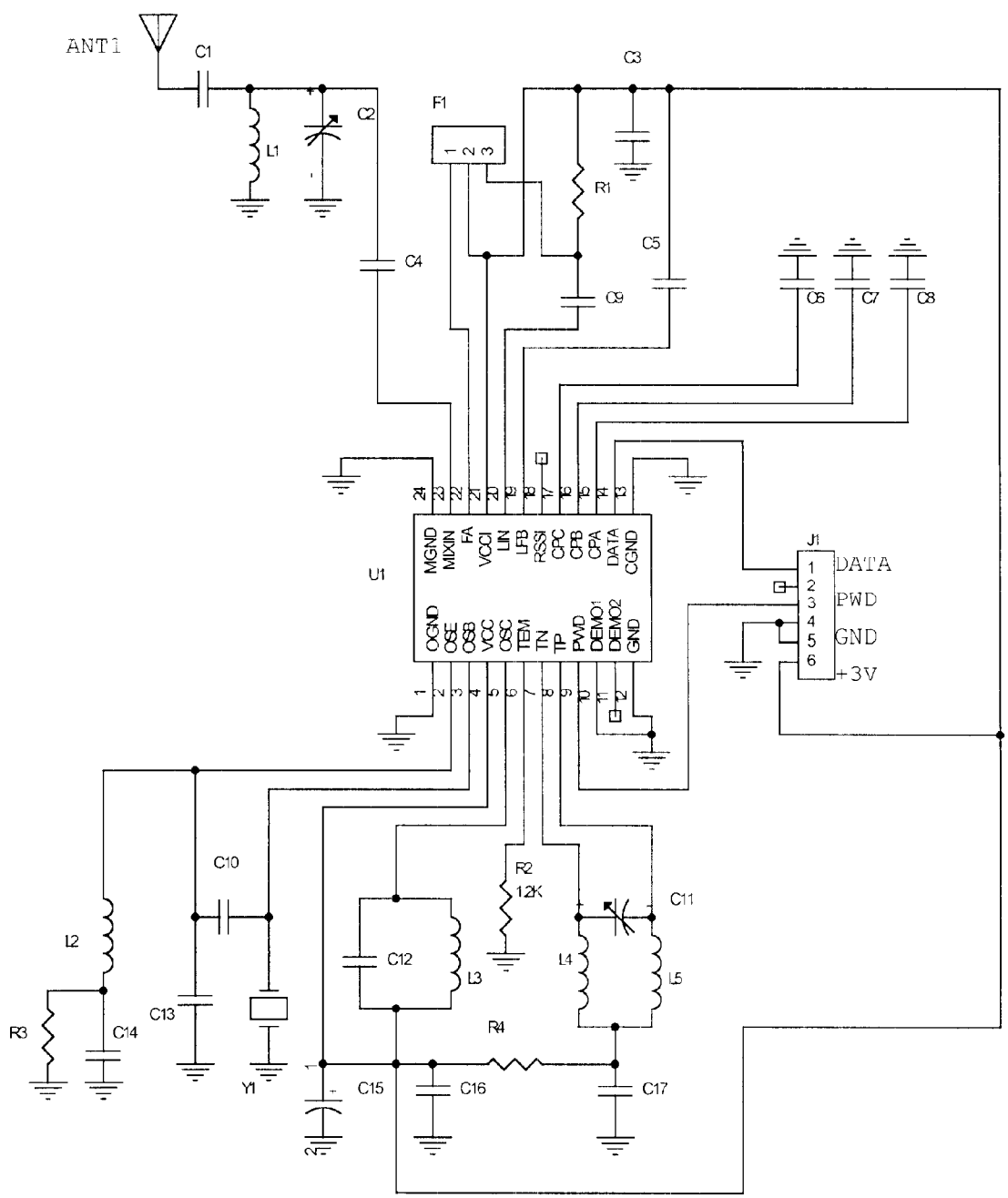
FIG. 4A is a schematic of the RF section of the monitor unit.

Referring to FIG. 4A, the monitor receiver obtains a +3V clean power from a J1 at pin 6. The incoming coded message, which is a 315 MHz RF Amplitude Shift Key (ASK) modulated signal, is received by a helical antenna ANT1 and processed by an ASK receiver module U1. The receiver module U1 is an integrated circuit with a built-in mixer, oscillator, frequency multiplier, post mixer amplifier, limiter, IF filter, demodulator, and data filters. The mixer is a single balanced emitter-coupled mixer with internal biasing. Matching of the RF source impedance to the mixer input requires an external circuit, which comprised capacitors C1, C2, C4 and inductor L1. The oscillator is based on a transistor connecting in a common collector configuration, and is followed by a cascade stage driving a tuned circuit. The voltage at this tuned circuit drives the frequency multiplier, resistor R3 sets the bias current of the oscillator, and overtone crystal Y1 controls the frequency of the oscillator. The capacitors between base and emitter C11 and ground C14 caused the oscillator transistor to appear as having negative resistance at small signal levels, and thereby caused the oscillator to start. A parallel resonance circuit L2 and capacitor C14, connecting to the emitter of the oscillator transistor, prevents oscillation at the fundamental frequency of the crystal. Capacitor C15 is used for bypass to ground. The LC tank circuit by L4, L5, and C12 at the output of the oscillator is used to select the third harmonic of the oscillator frequency. The frequency multiplier is an emitter-coupled transistor pair driving an off-chip balanced tuned circuit. Resistor R2 sets the bias current of this emitter-coupled pair. The bias voltage is set by resistor R4 to allow sufficient voltage swing at the mixer output. The post mixer amplifier (PMA) is a differential input, single-ended output amplifier. Amplifier gain is provided in order to reduce the influence of the limiter noise figure upon the total noise figure. The IF filtering with high selectivity is realized by means of the ceramic filter F1, which feeds the IF from the PMA at U1 pin 22 through the coupling capacitor C10 to the limiter input at U1 pin 20. The limiter is a single-end input, multiple stage amplifier with high total gain. Amplifier stability is achieved by means of the DC feedback capacitor C5, which is also used to determine the lower limiter cut-off frequency. Coming from the limiter, the ASK signal is fed into the Ask demodulator. After the demodulator, a two-stage data filtering circuit is provided in order to suppress unwanted frequency components. A RC low-pass filter by C7, C8, and C9 with on-chip resistors is provided. Finally, the digital data output of the monitor receiver module will be sent through J1 at pin 1, to the monitor logic section for further processing. For power management, the monitor receiver module can be set to sleep mode, and thereby consuming less power, by pulling down the voltage at pin 3 of J1.

Figure 4B:
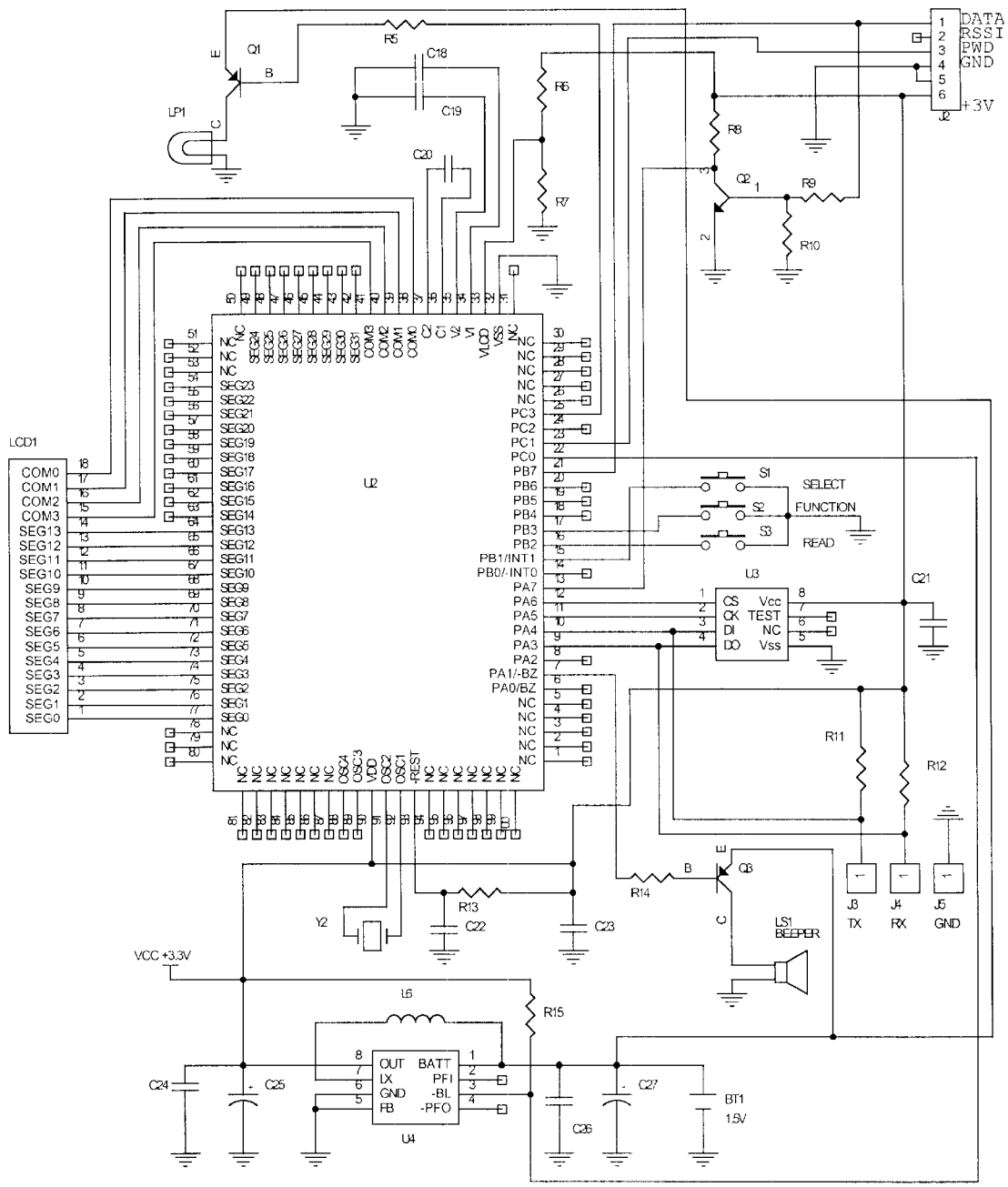
FIG. 4B is a schematic of the logic section of the monitor unit.

Referring to FIG. 4B, the monitor logic section includes a U2, which is a high performance eight-bit CMOS microprocessor with internal 4 K EPROM program memory, 160 bytes of RAM data memory and on-chip LCD driver. Microprocessor U2 is clocked by a 4 MHz crystal oscillator Y2. A one kilo bit serial electrically erasable programmable read only memory (EEPROM) U3 stores user-programmed low tire pressure trigger values, sensor module identification codes and other important parameters. EEPROM U3 is connected to microprocessor U2 at pins PA3, PA4, PA5, and PA6, respectively. The PC communication port for programming EEPROM U3 is provided by connectors J3, J4, and J5. Microprocessor U2 is powered by the reference VCC +3.3V having filter capacitors C23, C24, and C25. Upon power up, resistor R13 and capacitor C22 reset the microprobe of U2 to start execution of an operating program stored in the U2 EPROM. Microprocessor U2's LCD segment output seg0-13 and com0-3 are connected through a flexible cable to a display panel LCD1. Output at PC3 drives switch transistor Q1 through resister R5 to control the LCD backlight lamp LP1. Capacitors C18, C19 and C20 are used for on-chip LCD voltage pump. Resistors R6 and R7 provide a voltage for the LCD power supply. Microprocessor U2 output at pin PC1, connecting to pin 3 of J2, controls the power-up and power-down of monitor receiver FIG. 4A. To wake up microprocessor U2 itself from sleep mode, transistor Q2 and resistors R8, R9, R10 are used as an inverter for the input data so that a pull down level at J2 pin 1 will be provided to PA7 when the data preamble signal is presented. The input data from J2 pin 1 is sent to PB7 for decoding. Microprocessor U2 pins PB1, PB2, and PB3 are connected to monitor key-switches S1, S2 and S3, respectively, for receiving user manual inputs. A buzzer LS1 is a piezoelectric ceramic device driven by transistor Q3, which has a base resistor R14 connecting to microprocessor U2 at an output pin PA1. Buzzer LS1 is energized by microprocessor U2 to alert the user when the monitor receives and decodes a low tire pressure message from a tire sensor module, or a car alarm tripped message from the alarm trigger sensor module. To operate the monitor by a single 1.5V battery BT1, the DC—DC converter that consists of U4, L6, C26 and C27 converts BT1 power to a constant +3.3V voltage VCC. When BT1 voltage drops to lower than 0.9V, U4 generates a battery low signal at pin 4, which will then be provided to microprocessor U2 input pin PC0. In this case, the monitor lights up the battery low icon S13 and generates battery low alert to inform user for replacing the battery.

Figure 2B:
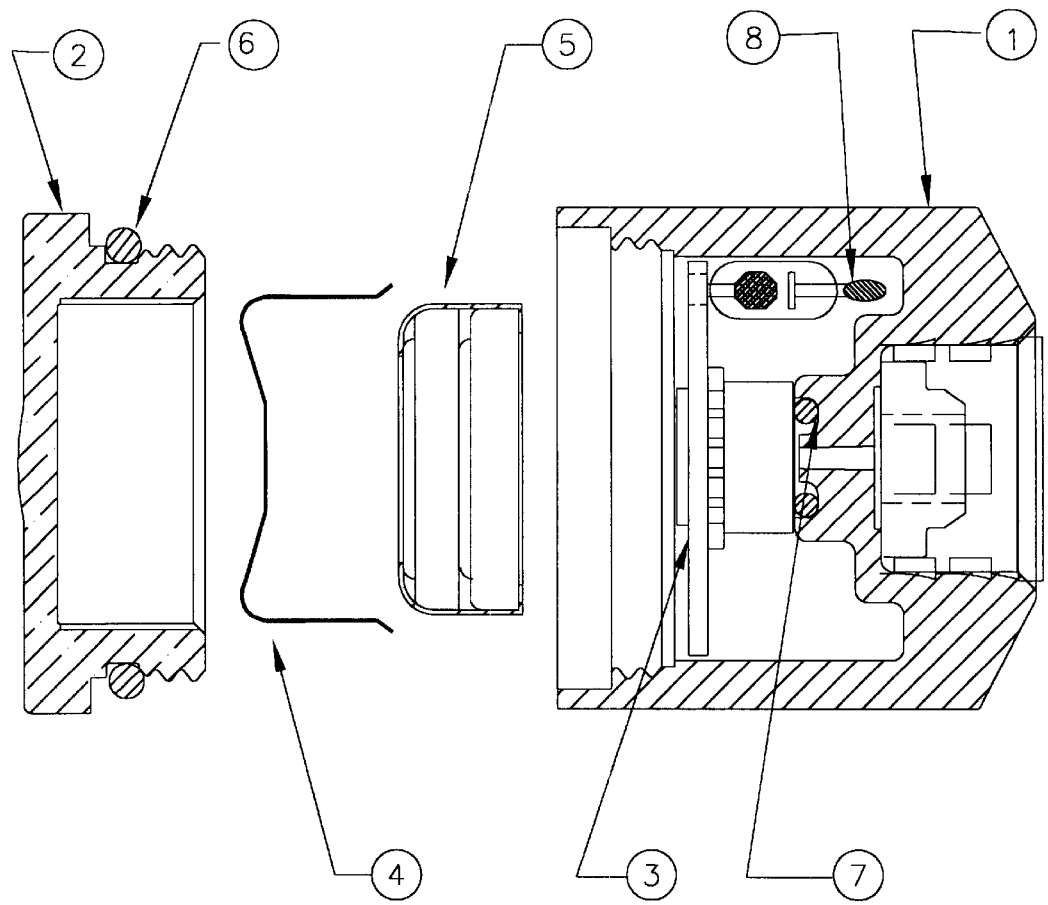
FIG. 2B is a sketch of the miniature tire pressure sensor module assembly.
Figure 2C:
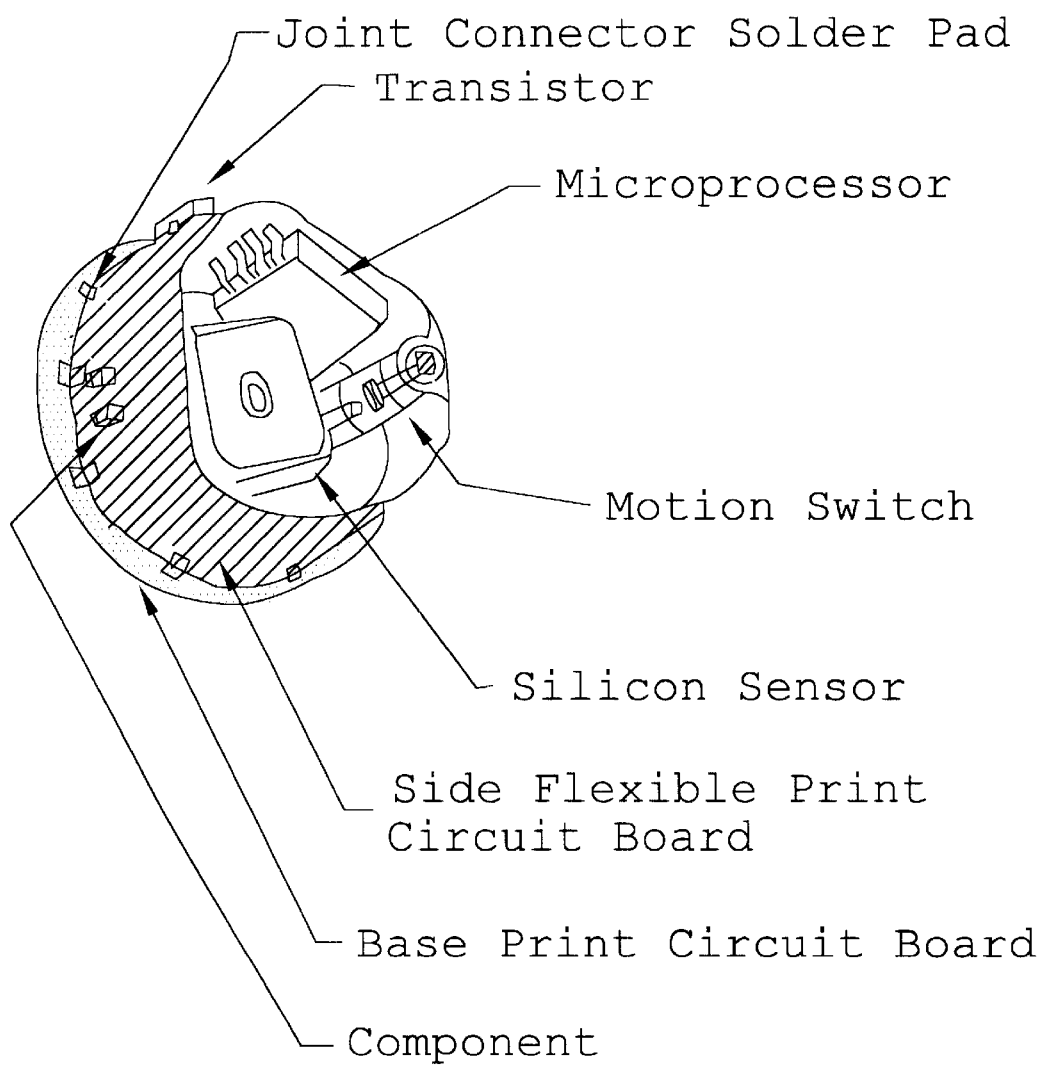
FIG. 2C is a sketch of the tire pressure sensor stack assembly.
Figure 2D:
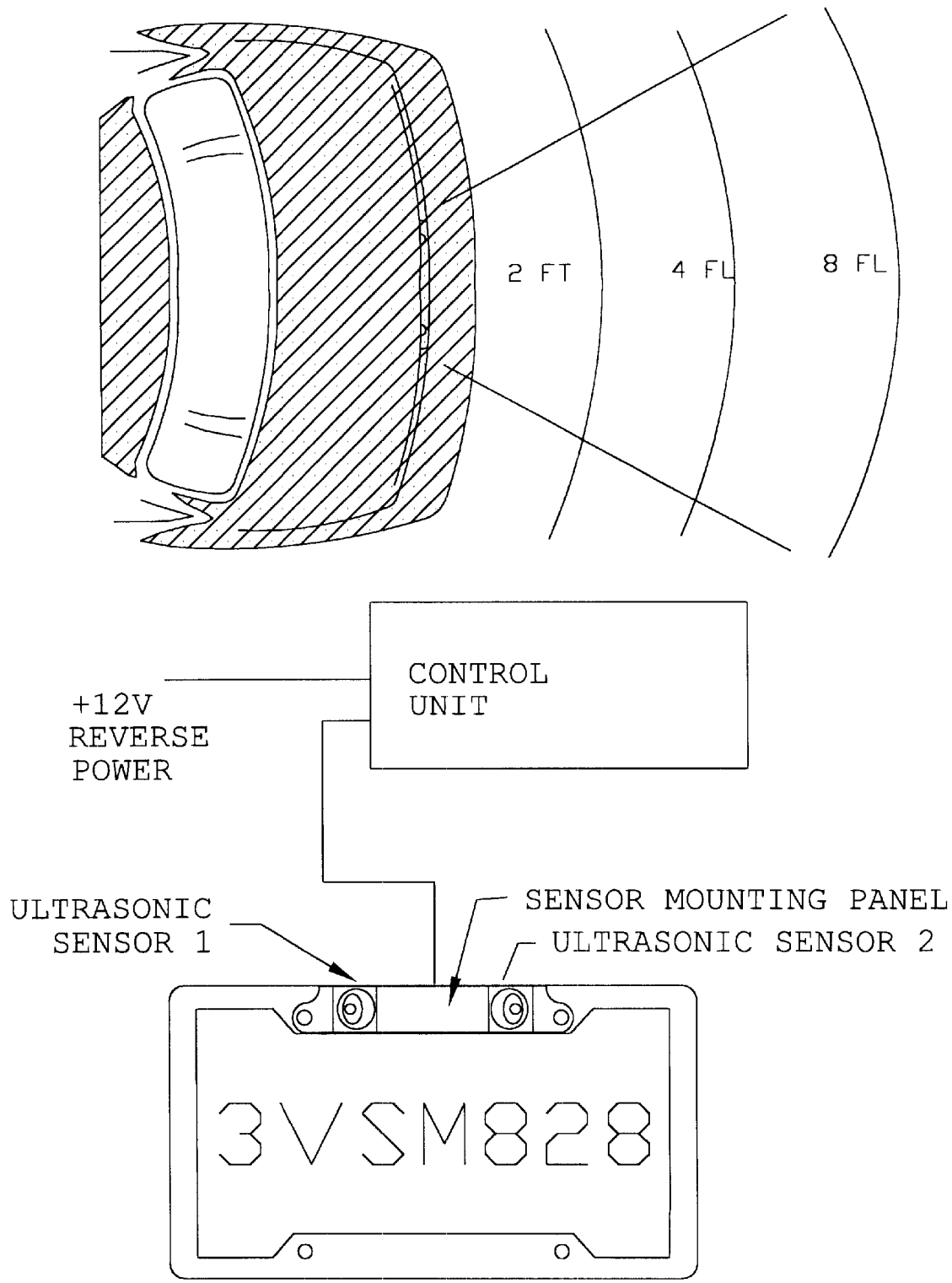
FIG. 2D is a sketch of the object detection module installation.
Figure 5:
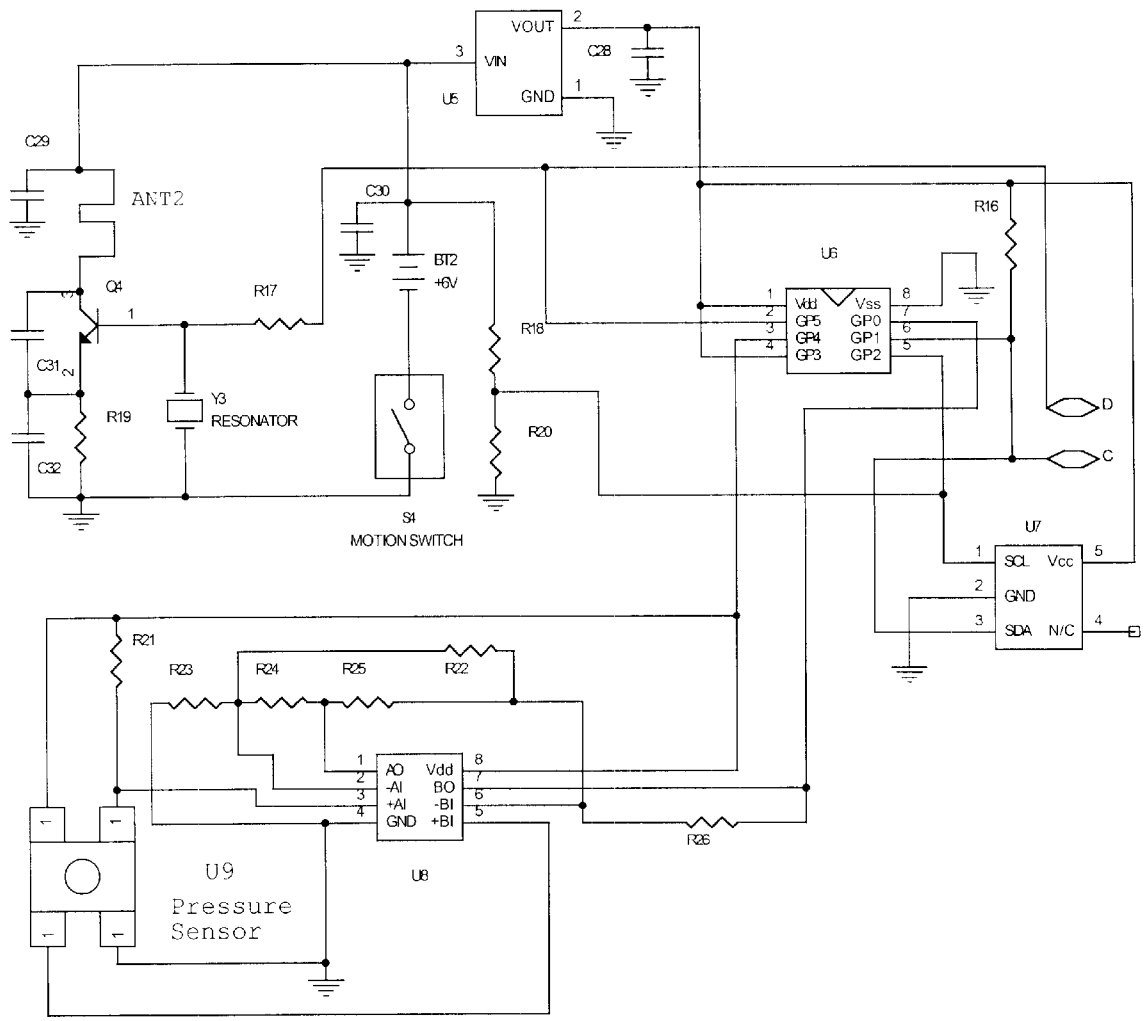
FIG. 5 is a schematic of the tire pressure sensor module.

Referring to FIG. 5, the tire pressure sensor module is housed in a plastic enclosure, shown by FIG. 2B, and is securely fastened to a respective tire valve stem, also shown by FIG. 2A. The tire pressure sensor module is assembled with a base print circuit board and a flexible print circuit board, shown by FIG. 2C. FIG. 2C shown a unique way of constructing miniature assembly, wherein the pressure sensor is installed on a circular base print circuit board, while the other components are installed on a flexible print circuit sheet. The flexible sheet is then mounted vertically on the base circuit board and surrounded the protruding pressure sensor, thereby achieving optimal space utilization within the small cylindrical enclosure. The tire pressure sensor module electronics support sensory logic and transmitter functions. Sensory electronics include a piezo-resistive pressure sensor U9, which comprises four strain resistive sensitive resistors diffused in silicon. These resistors are connected in a Whetstone bridge configuration, whereby two resistors increase resistance with positive pressure while the other two decrease in resistance. When pressure is applied to sensor U9, the resistors in the arms of the bridge of sensor U9 changed resistance by an amount directly proportional to the pressure applied. When a voltage is applied to the bridge, there will be a resulting differential output voltage indicating sensed tire pressure. Sensory logic consists of (1) a micro-power dual amplifier U8 connected to the sensor bridge U9 and to resistors R21 through R26, (2) a voltage regulator U5 having filter capacitor C28, and (3) another high performance CMOS eight-bit microprocessor U6 with an attached EEPROM U7 using a pull up resistor R16 on GP1 input. A six-volt battery pack BT2 having filter capacitor C30 is connected to switch S4, which is a mercury roll omni-directional motion switch activates by gravitational forces. In S4, pure hydrogen gas is contained in a small glass container, shown by FIG. 2A, encapsulating first and second electrical contacts. Under gravitational or centrifugal forces, mercury disposed on the first electrical contact flows to make contact with the second electrical contact and thereby closes switch S4. A tire value stem mounted switch S4 can detect sufficient motion and close switch contacts within 100 milliseconds after the vehicle reaches between 12 to 15 miles per hour. Those skilled in the art are adept at making motion detection switches sized to a small valve stem plastic casing. Battery BT2 output voltage level is divided by resistors R18 and R20 to provide an analog battery voltage value to microprocessor U6, which can then convert it into a digital value for monitoring battery BT2 usage. The micro-power amplifier U8 conditions the sensed tire pressure voltage signal for input to the on-chip A/D converter of microprocessor U6, as an indication of the tire pressure sensed by sensor U9. The radio frequency transmitter consists of transistor circuit Q4, resistors R19, inductor antenna ANT2, capacitors C29, C31, and C32, and a SAW resonator Y3 for providing a transmitter frequency signal at 315 MHz. The transmitter is modulated by microprocessor U6 at pin GP5 through resistor R17. The GP0–GP5 terminals of microprocessor U6 are bi-directional inputs and outputs. Terminal GP0 is used to receive the analog pressure signal for the on-chip A/D converter. Terminal GP1 is used to send or receive data to EEPROM U7. Terminal GP2 receives the battery voltage level reference and can output a digital clock signal to EEPROM U7. Terminal GP3 is connected to U5 at VOUT pin for the on-chip power-on reset. Terminal GP4 is an output used to power sensor U9 and amplifier U8.

For reducing the circuit size, an internal 4 MHz RC oscillator is used to clock microprocessor U6. Terminal GP5 outputs data to the transmitter for amplitude modulation of the 315 MHz radio frequency carrier signal. Under program control, microprocessor U6 outputs an encoded digital message data string for amplitude shift key modulating the carrier signal from the RF transmitter circuit. To minimize power consumption, the tire pressure sensor module operates in a dormant mode and is only powered up when the tire is in motion, as detected by motion switch S4 that operates to connect battery BT2 to the electronic components of sensor module. Microprocessor U6 is programmed to periodically read the tire air pressure from sensor U9 through amplifiers U8. If there has been a significant pressure change, such as +/−2PSI, from the previous reading, the sensor module transmits an ASK modulated radio frequency signal to the monitor using inductor antenna ANT2. The RF message consists the sensor module ID, tire air pressure value, battery level data, and checksum. Upon receiving the RF message from the tire sensor module, the monitor compares the tire pressure value received to a preprogrammed value stored in the EEPROM U7. If the received value is less than a predetermined low-pressure trigger value, the monitor alerts the driver by displaying the low tire pressure value on LCD, by flashing the corresponding tire icon for the respective tire, and by sounding an alarm using buzzer LS1.

Figure 6:
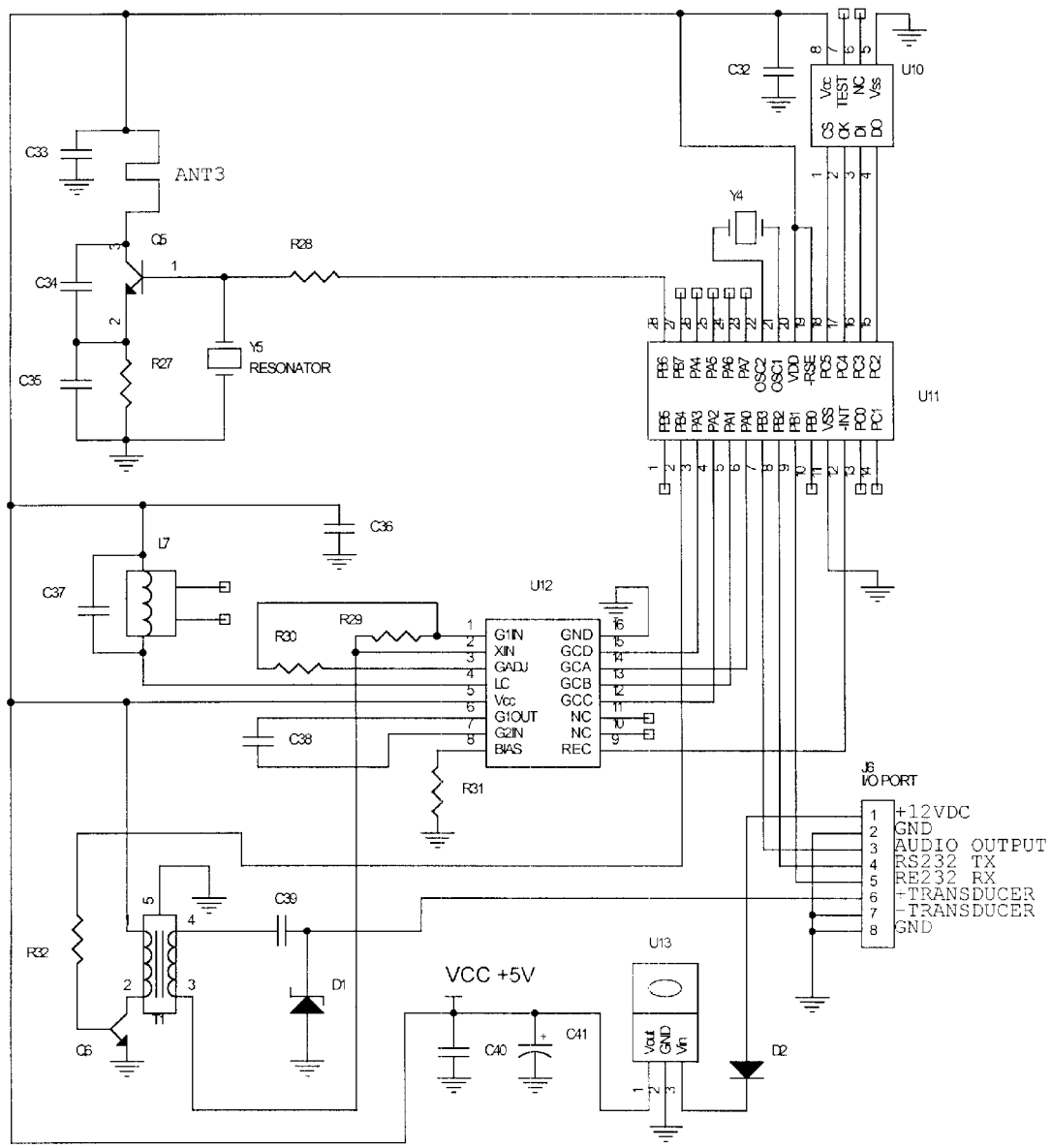
FIG. 6 is a schematic of the object detection module.

Referring to FIG. 6, the object detection module is powered by the vehicle reverse lamp's +12V power, which will be present when the vehicle is in reverse motion. Diode D2 is used for the +12V input protection. The +12V power is converted to VCC +5V power by regulator U13, and capacitors C40 and C41. U12 is a gain control amplifier for use with microprocessor U11 to receive the sonar echo signal. Resistor R31 connects amplifier U12 at pin 8 to ground for providing the internal biasing reference. The amplifier U12 gain can be set with a resistor R30 from GIN to GADJ. Digital control of amplifier U12 gain is provided with gain control inputs at amplifier U12 pin GCA, GCB, GCC and GCD. These inputs have to be driven synchronously (all inputs were stabilized within 1 us) by microprocessor U11 at pins PA0–PA3. Capacitor C38 provides an AC coupling between different amplifier U12 stages for proper biasing. A parallel combination of inductor L7 and capacitor C37, between amplifier U12 at pin LC and pin Vcc, provides amplifier U12 with an externally controlled gain. This circuitry allows the gain control to compensate for the attenuation of distant signals and, at the same time, also maximizes noise and side lobe rejection. Amplifier U12, at pin XIN, and diode D1 provide clamping for the transformer T1 secondary when used for transducer during the ultrasonic transmitting. The amplifier U12 output is normally held at a low level by an internal 1 uA current source. When an input of sufficient amplitude is received, the 1 uA discharge current and a 50 uA charging current alternately drive the output. A capacitor C42 is required to connect amplifier U12 at pin REC to ground for integrating the received signal, so that one or two noise pulses are not recognized. To cover a larger area behind the vehicle, two ultrasonic transducers are used, shown by FIG. 2D. The transducer pair can be mounted on the license plate holder and be secured by the existing anchoring screws, shown by FIG. 2D. The two ultrasonic transducers are both connected to an I/O port J6 at pin 6 and pin 7. During vehicle reverse motion, microprocessor U11 generates 15 pulses of 49.4 KHz burst signal, and outputs this ultrasonic signal at pin PB4 to a transformer T1 at pin 2, first through a resistor R32 and then a transistor Q6. Transformer T1 outputs the transformed signal at pin 4, through an AC coupling capacitor C39, to I/O port J6 at pin 6, and thereby trigger the transducers to send out ultrasonic pulses. After the ultrasonic pulses are sent, these transducers are used as sensors to pickup the echoed back ultrasonic signals from nearby objects. The echo signals are then fed to amplifier U12 pin G1IN through capacitor C39, transformer T1 secondary, and resistor R29. When the echo signals reached a predetermined strength level, amplifier U12 pin REC provides a high level output to microprocessor U11 pin 13 to inform that an object echo was detected. The echo time, then, is the time differential between sending out ultrasonic pulse and receiving its echo. After the echo time is computed, microprocessor U11 then calculates the detected object range with the following equation:

Distance (in inches)=Echo time/147.9 microseconds.

When the object range data is obtained, microprocessor U11 produces a data stream, incorporating with an identification code, range data and a checksum, and sends it over to a RF transmitter circuit, which consists a transistor Q5, resistors R27 and R28, capacitors C33–C35, and a resonator Y5. Microprocessor U11 sends the data stream out at output pin PB6 to transistor Q5 through resistor R28 to modulate the 315 MHz RF. The modulated RF signal is then transmitted by antenna ANT3. Microprocessor U11 also provides an audio output control at pin PB3 to I/O port J6 pin 3 for generating different acoustic tones to represent the detected object distance.

An oscillator consisting of a 4 MHz crystal Y4 clocks microprocessor U11. A capacitor C32 provides the AC de-coupling for U10 and U11. A 1 K bits EEPROM U10 is used to store sensor module ID and some important parameters. For writing the ID and parameters to EEPROM U10, microprocessor U11 supports a RS232 TX/RX connection to I/O port J6 at pin 4 and pin 5 for communication between a PC and the sensor module.

Figure 7:
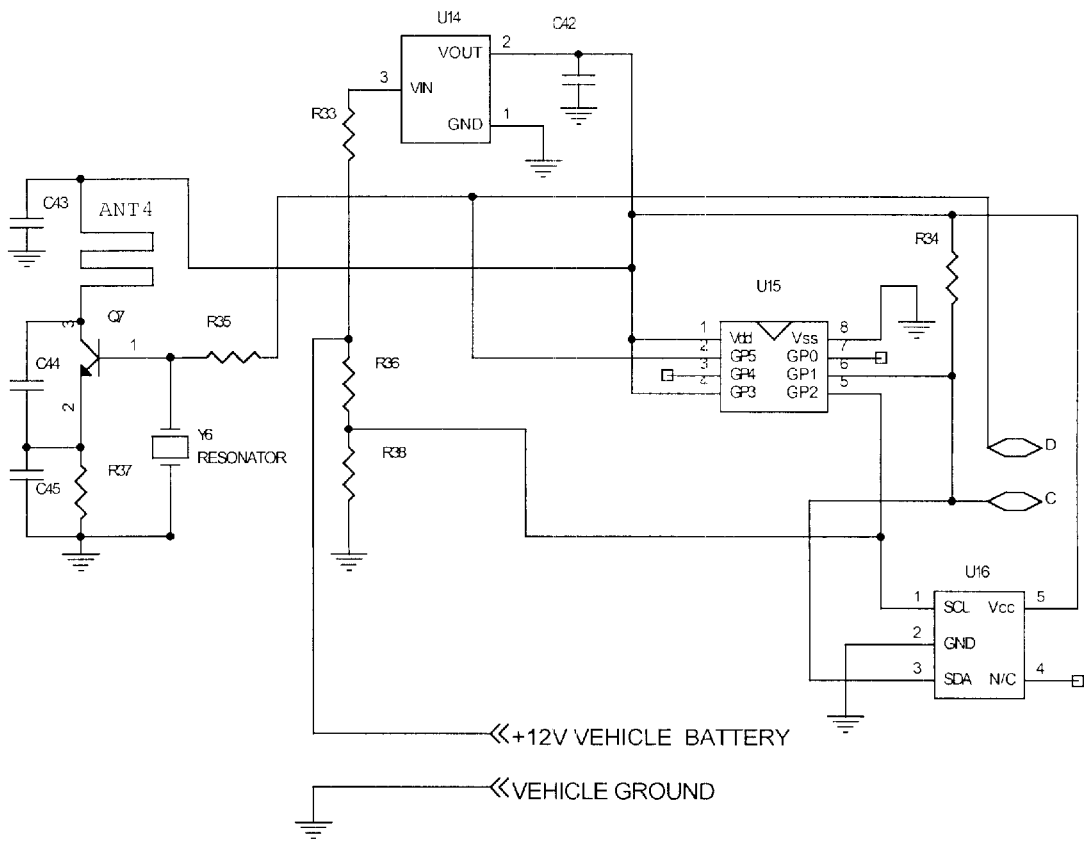
FIG. 7 is a schematic of the vehicle engine On/Off sensor module.

Referring to FIG. 7, the vehicle engine On/Off sensor module is housed in a miniature enclosure, not shown, and is mounted near the vehicle battery power line to monitor the battery voltage change. For passenger vehicles, there is about a two-volt battery voltage difference when the engine is on versus when it's off. When the engine is off, the battery voltage power is at around +12V and, when the vehicle engine is turned on, the battery voltage power is increased to around +14.4V. For sensor module power supply, a voltage regulator U14 at pin VIN is connected to the vehicle battery through a resistor R33 and, at pin VOUT with a filter capacitor C42, outputs a +5V voltage. In addition, the vehicle voltage power is applied to a resister diver R36 and R38 to provide an analog voltage value for a microprocessor U15's on-chip A/D at pin GP2. The high performance CMOS eight-bit microprocessor U15 has an on-chip A/D pin at GP2 to convert the analog voltage value to a digital value. A 16-byte EEPROM U16 with a pull up resistor R34 provides memory space to store module ID and some important parameters. The radio frequency transmitter consists of transistor Q7, resistors R37, inductor antenna ANT4, capacitors C43, C44, and C45 and a SAW resonator Y6 for providing a transmitter frequency signal at 315 MHz. The transmitter is modulated by microprocessor U15 at pin GP5 through a resistor R35. When microprocessor U15 detected the vehicle battery voltage changed to above +12V and near +14.4V, an engine-on message is sent to the monitor, otherwise, an engine-off message is sent to the monitor. When the vehicle engine is turned off, the monitor is put to sleep for reducing its battery power consumption. The monitor can still receive messages in sleep mode if the incoming signal had a long enough preamble period of over 2 seconds. Upon receiving the engine-on message, the monitor wakes up and resumes normal operation, until receiving the engine-off message and going back to sleep again.

Figure 8:
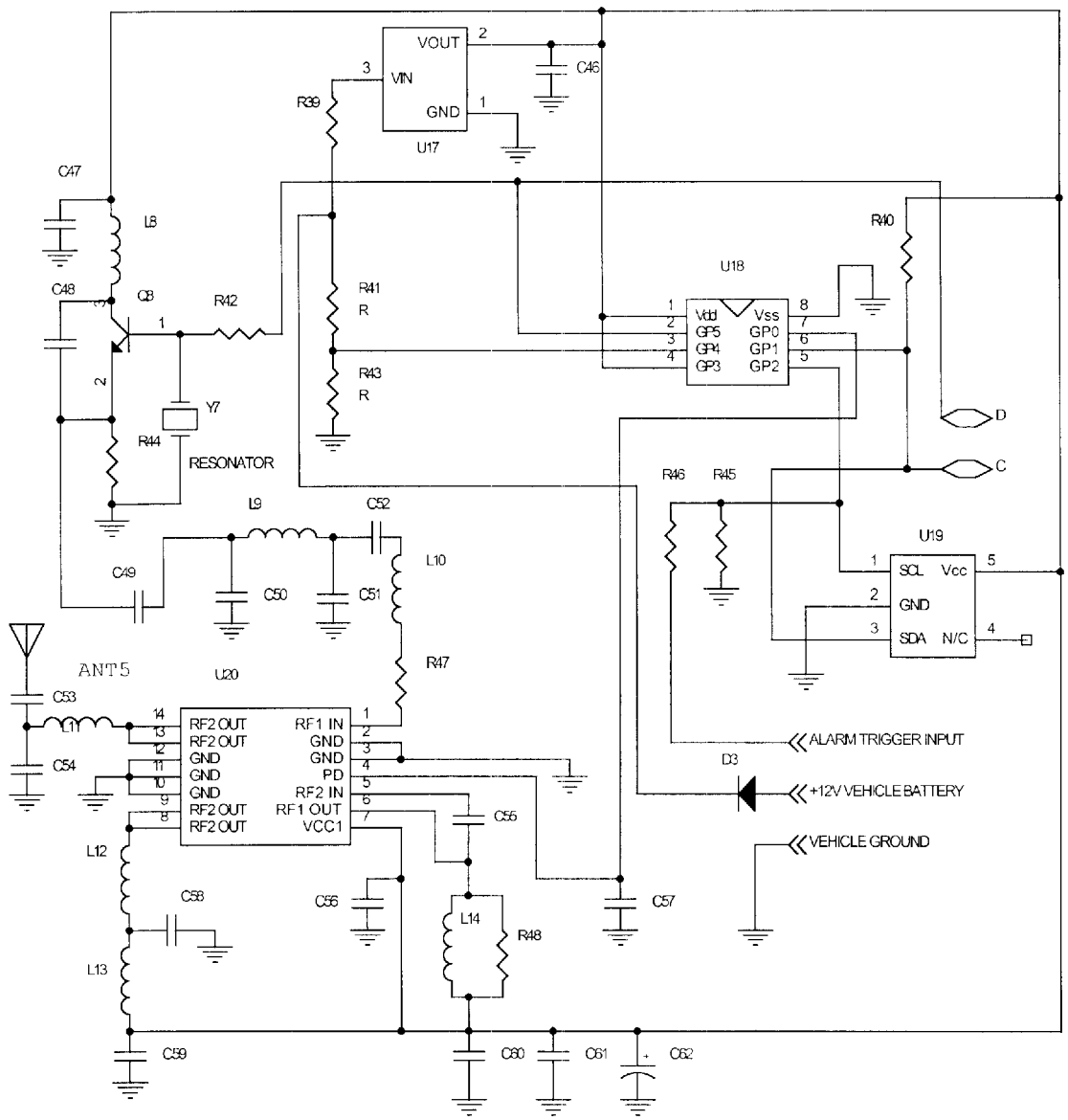
FIG. 8 is a schematic of the alarm trigger sensor module.

Referring to FIG. 8, the vehicle alarm trigger sensor module is used to monitor the car alarm system, and is mounted near the existing vehicle alarm system. For module power supply, a voltage regulator U17 at pin VIN is connected to the vehicle battery through a resistor R33 and a protection diode D3 and, at pin VOUT with a filter capacitor C46, outputs a +5V voltage. A 16-byte EEPROM U16 with a pull up resistor R40 provides memory space to store module ID and some important parameters. A transmitter circuitry sends RF messages to the monitor. The transmitter consists of a RF oscillator, a low pass filter match network, and a RF power amplifier U20 to keep the RF signal strength at a range of over 1000 feet. The RF oscillator consists of a-transistor Q8, a resistor R44, a resonator Y7, and capacitors C47 and C48. The low pass filter match network consists of a resistor R47 and capacitors C49, C50, C51, C52, L9, and L10. The RF power amplifier U20 is a medium power linear amplifier IC. When the car alarm system is trigged, it sends a high DC voltage to the audio alarm siren. This DC voltage source at the siren terminal provides an alarm trigger input signal to a microprocessor U18 at pin GP2, through a resistor diver R46 and R45. When microprocessor U18 sensed the trigger voltage, it sends out an "alarm system trigged" message at pin GP5. The message data, which includes a module ID, trigger data, and a checksum, is sent to transistor Q8 through resistor R42 to modulate the 313 MHz RF oscillator. Output from the oscillator goes through the low pass filter match network onto the RF power amplifier U20, at pin 'RF1 IN'. The power-down pin at amplifier U20 pin PD is controlled by the microprocessor U18 pin GP0 having an AC de-coupling capacitor C57. A capacitor C55 provides the coupling between pre-amplifier output pin 'RF1 OUT' and RF power stage input pin 'RF2 IN'. An inductor L14 and a resistor R48 provide a match load impedance for the two stages. Capacitors C56, C59, C60, C61, and C62 are used for RF de-coupling. A capacitor C58 and inductors L12 and L13, together, is an AC de-coupling network between the DC power and RF power amplifier U20 output, which provides filtered DC power for the RF power amplifier U20. Finally, RF power amplifier U20 sends out a RF output through a match network of L11, C53 and C54 to the antenna ANT5 for transmission.

Figure 9:
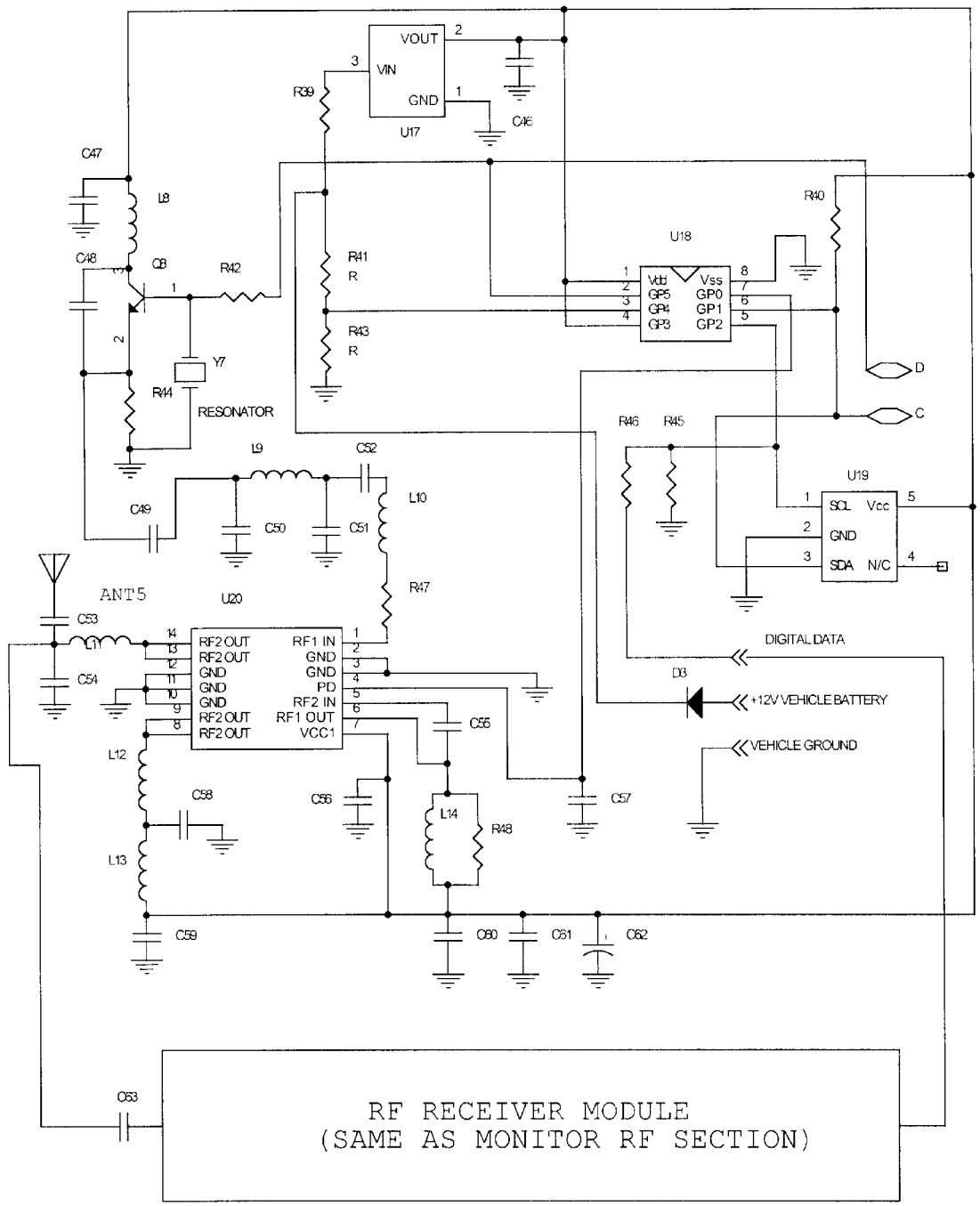
FIG. 9 is a schematic of the RF signal repeater module.

Referring to FIG. 9, the RF signal repeater module is used to re-transmit the sensor module RF signals for enhancing monitor signal reception. For example, signals from tire pressure sensor modules mounted on the rear wheels of a long truck or trailer might be too weak for the cab-mounted monitor to receive. A RF signal repeater, installed near the rear section of the truck, can pick up the sensor module signal and then re-transmit the signal to the monitor via a more efficient antenna. The repeater works in a half-duplex mode. Any sensor signals picked-up by the repeater will be transmitted out in the same signal format. Therefore, the receiver and transmitter of the repeater can share the same antenna ANT3. The receiver circuit is the same as the RF section of the monitor. The transmitter circuit is same as in FIG. 8. The received sensor signal is sent to the receiver through a capacitor C63. The demodulated digital data is sent to a microprocessor U18 pin 5 by a resistor network of R46 and R45. Upon receiving the signal, microprocessor U18 will send out the received data, in its original format, to the transmitter for transmission.

The message protocol starts with a preamble period and a synchronization period, then followed by sensor group ID, sensor ID, message data, parameter data, and lastly the checksum. The sensor group ID represented difference sensor module. The sensor ID is an identification number of the respective sensor module within same sensor group ID. The preamble period is 4 milliseconds for the tire pressure sensor module and 2.5 seconds for all other sensor modules. Base on the preamble period design, a power saving scheme is used in the monitor. When the monitor detected a vehicle engine 'Off' message, it goes into a long sleeping mode. Thereafter the monitor wakes up every 2 seconds and powers up the receiver to determine whether any engine 'On' or alarm trigger signal is present. If there is an "alarm trigger" message, the monitor will generate a 80 dB audio alert and display the alarm icon on LCD, then the monitor will go back to sleep. If it is an engine 'On' message, monitor will go into a short sleeping mode, waking up every 4 milliseconds and powering up the receiver to check for new messages. The monitor will once again go back to long sleep upon receiving an engine 'off' message.

The wireless data communication is one-way from the sensor modules to the monitor. The transmission signal is in bits having logic one or logic zero as value, and is represent by variations in the signal amplitude modulation level. A bit time period is divided into 3 T's, with each T at about 270 microseconds. When the amplitude modulation level is high for two T and low for one T, the signal is logic one. Otherwise when the amplitude modulation level is high for one T and low for two T, the signal is a logic zero. Messages are preferably transmitted with the most significant bits first. It is difficult for the monitor microprocessor to synchronize the receiving data message without know the timing. Therefore, a 10 T synchronization period will be sent by a sensor module after the preamble period, so that the monitor microprocessor can calculate the pulse period with the following equation:

$$T=(\text{detected synchronize period})/10.$$

Since the tire pressure sensor module is mounted on the tire valve stem, it is very difficult to use traditional mechanical roll motion switch to detect vehicle motion with a 360-degree tire rotation. The usage of omni-directional mercury roll motion detection switch is a key invention to solve this problem. Until now, there is no sufficiently small tire valve stem mounted sensors available. The present invention provided a miniature assembly design for the tire pressure sensor module. In the present invention, the height of the tire pressure sensor module for the valve stem is contributed mainly by the heights of the silicon sensor and the battery pack. Most other components are mounted on a rectangle flexible print circuit board, shown by FIG. 2C, like a donut around the silicon sensor. The total height of the sensor over the top of valve stem is only 0.62 inch in the present invention.

The above system and methods describe a preferred embodiment using exemplar devices and methods that are subject to further enhancements, improvement and modifications. However, those enhancements, improvements modifications may nonetheless fall within the spirit and scope of the appended claims.

ADDITIONAL PREFERRED EMBODIMENTS AND SCOPE

The above-preferred embodiment illustrated a typical embodiment of the present invention. There are various possibilities with regard to additional embodiments.

An additional embodiment for a tire pressure monitoring system can be illustrated with a combination of a monitor unit with tire pressure sensor modules, shown in, FIG. 1, FIG. 2A, FIG. 2B, FIG. 2C, FIG. 3, FIG. 4A, FIG. 4B, FIG. 5, and FIG. 7.

Another additional embodiment for an object detection system can be illustrated with a combination of a monitor unit with object detection modules, shown in FIG. 1, FIG. 2D, FIG. 3, FIG. 4A, FIG. 4B, FIG. 6, and FIG. 7.

Another additional embodiment for an alarm remote notification system can be illustrated with a combination of a monitor unit with an alarm trigger sensor modules module, shown in FIG. 1, FIG. 3, FIG. 4A, FIG. 4B, FIG. 7, and FIG. 8.

Although the description above contains many specificities, these should not be construed as limiting the scope of the invention but as merely providing illustrations of some of the presently preferred embodiments of this invention. Thus the scope of the invention should be determined by the following claims and their legal equivalents, rather than by the examples given.

What I claim as my invention is:

1. A wireless vehicle monitor system, comprising a monitor, an engine on/off sensor module, a tire pressure sensor module, an object detection sensor module, and an alarm activation sensor module,
    a) said monitor, comprising:
        (i) circuit means, including RF signal reception means for receiving coded messages and interface means for receiving inputs from and providing outputs to user,
        (ii) logic processing means for controlling system operation, decoding data messages, and managing power consumption,
    b) said engine on/off sensor module, comprising:
        (i) circuit means, including interface means for connection to the vehicle electrical system and RF signal transmission means for transmitting coded messages,
        (ii) logic processing means for controlling module operation, determining vehicle engine ON and OFF status, and generating coded messages,
    c) said tire pressure sensor module, comprising:
        (i) circuit means, including sensing means for determining tire air pressure, motion detection means for detecting vehicle movement, and RF signal transmission means for transmitting coded messages,
        (ii) assembly means for producing a miniature electronic assembly with a combination of rigid and flexible print circuit boards,
        (iii) housing means for packaging said miniature sensor module for secure mounting on a tire valve stem,
        (iv) logic processing means for controlling module operation, generating tire pressure data messages, and managing power consumption,
    d) said object detection sensor module, comprising:
        (i) circuit means, including an ultrasonic transducer for generating ultrasonic sound wave, a gain controllable amplifier for receiving object echo signal, and RF signal transmission means for transmitting coded object range messages,
        (ii) logic processing means for controlling timing, generating ultrasonic waveform, calculating detected object distance, and modulating the RF transmitter,
        (iii) installation means for mounting said module on vehicle license panel,
    e) said alarm activation sensor module, comprising:
        (i) circuit means, including RF signal transmission means for transmitting alarm activation messages, and RF power amplification means for long range transmission of the messages,
        (ii) interface means for connection to existing vehicle alarm system for detection of alarm activation, and for connection to engine on/off sensor module for detection of engine-on status,
        (iii) logic processing means for determining the vehicle alarm system activation and engine ignition, and accordingly triggering the alarm activation message transmission.

2. The system of claim 1, comprising a plurality of tire pressure sensor modules that are respectively attached to a plurality of tire valve stems of a vehicle.

3. The system of claim 1, wherein the communication messages further comprises an identification code for identifying individual sensor modules.

4. The system of claim 1, wherein the monitor further comprises battery power saving means for consuming less power upon receipt of a sleep or engine-off message, and resuming normal operation after receipt of a wake-up or engine-on message.

5. The system of claim 1, wherein the tire pressure sensor module further comprises an omni-directional mercury roll motion detection switch for detecting vehicle movement.

6. The system of claim 1, wherein the tire pressure sensor module further comprises battery power saving means for operating, and thereby consuming power, only when its built-in omni-directional mercury roll motion detector detected motion and switched on the power supply.

7. The system of claim 1, wherein the tire pressure sensor module further comprises means for constructing miniature assembly structure, by vertically mounting a flexible circuit board on a base circuit board, and surrounding the base components.

8. The system of claim 1, further comprising a RF signal repeater for receiving sensor module signals and then re-transmit the same signals.

9. The system of claim 1, wherein the engine on/off sensor module further comprises means for determining the vehicle engine ON or OFF status, in accordance with the differential battery voltages associated respectively with a turned-on engine versus a turned-off engine.

10. The system of claim 1, wherein the monitor further comprises display means for a graphical representation of sensor module positions on a vehicle, shown in FIG. 3.

* * * * *